June 26, 1973   H. L. STROTERHOFF   3,741,727
ARSENIC SAMPLER
Filed Feb. 4, 1972
Fig. 1
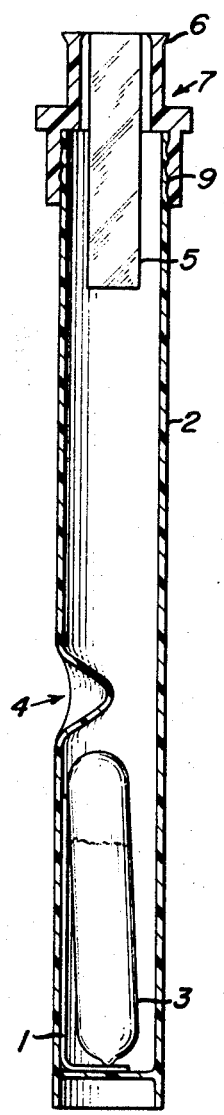
Fig. 2
Fig. 3
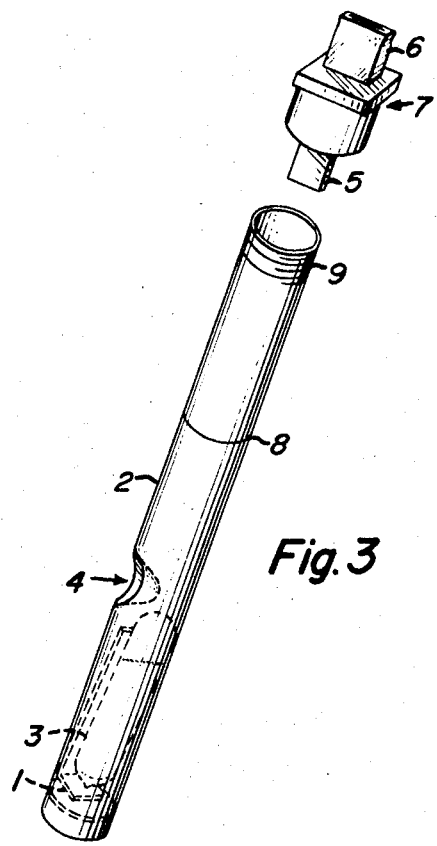

United States Patent Office 3,741,727
Patented June 26, 1973

3,741,727
ARSENIC SAMPLER
Howard L. Stroterhoff, Baltimore, Md., assignor to the United States of America as represented by the Secretary of the Army
Filed Feb. 4, 1972, Ser. No. 223,513
Int. Cl. G01n 31/22, 33/18
U.S. Cl. 23—230 R  9 Claims

ABSTRACT OF THE DISCLOSURE

An apparatus and method to indicate the presence of arsenicals in water whereby a sample of water is taken into a clear and flexible plastic tube; a cap having a detection paper impregnated with a mercuric salt mounted in the cap is inserted on to the plastic tube to retain the water sample therein; a sealed thin wall glass ampule fixedly retained in the plastic tube is broken by squeezing the plastic tube at the ampule location and with the ampule between the fingers to release to the water sample a mixture of potassium bisulfate and cupric sulfate contained in the ampule to react with the water sample and any arsenical material therein and a zinc strip within the plastic tube; and any arsenical material present in the water being detected by a yellow to brown color imparted to the detection paper upon reaction of the mercuric salt therein with arsine produced upon release of the ampule contents to the water sample.

---

The invention described herein may be manufactured, used, and licensed by or for the Government for governmental purposes without the payment to me of any royalty thereon.

My invention relates to a new apparatus and method to detect arsenical material in water.

Prior art arsenical detection techniques, such as the conventional Gutzeit methodology, presented the problem that they were time consuming and necessitated apparatus which was expensive and made fast on the spot tests impossible. My invention was conceived and reduced to practice to solve the aforementioned problem and to satisfy the long felt need for an arsenic sampler and method which is easily fabricated from inexpensive and readily available materials, can be operated by unskilled personnel, is readily portable, is disposable, and provides a fast on the spot detection means for detecting low concentrations of arsenicals in water.

My invention has utility for process plant, field and/or laboratory detection of arsenicals in water.

A principal object of my invention is to provide a reliable, effective, fast, and portable means and method to detect low concentrations of arsenical materials in water.

Another object of my invention is to provide an economical means and method which can be operated by unskilled personnel to detect low concentrations of arsenical materials in water.

Other objects of my invention will be obvious or will appear from the specification hereinafter set forth.

FIG. 1 is a view showing my assembled arsenic sampler apparatus.

FIG. 2 is a detail view of the cap for my arsenic sampler apparatus shown in FIG. 1 and having detection paper mounted therein.

FIG. 3 is a detail view of the plastic tube of my arsenic sampler apparatus shown in FIG. 1.

My invention, as shown in FIGS. 1 to 3, will now be described in detail as follows.

My apparatus is fabricated by placing a ½-gram strip of zinc metal 1 having a right angle bend, as shown in FIGS. 1 and 3 in flexible plastic tube 2 and superimposing sealed clear thin wall glass ampule 3 containing a ½-gram mixture of 99 parts of potassium bisulfate and one part of cupric sulfate over the zinc metal strip, as shown in FIGS. 1 and 3. The dimple shown at 4 in FIGS. 1 and 3 is formed in plastic tube 2 by conventional heat and pressure technique to retain zinc strip 1 and ampule 3 in a fixed position within plastic tube 2 to prevent accidental and premature breaking of easily crushed ampule 3. Detection paper 5 has a mercuric salt, such as mercuric bromide, impregnated therein in the conventional manner; the paper being any conventional unsized paper such as used to impregnate litmus therein. Paper 5 is fixedly mounted within plastic tongue 6 of the plastic cap shown at 7 in FIG. 2 in any conventional manner, such as heat pressing. A water level mark 8 is scribed on plastic tube 2 in the conventional manner to provide an indicator as to the quantity of water to sample.

To use my sampler, plastic tube 2 is filled with a quantity of water to be tested up to water level mark 8; the cap shown at 7 with detection paper 6 mounted therein with a mercuric salt impregnate therein is threadably inserted on plastic tube 2 by means of threads 9; plastic tube 2 at the location of ampule 3 is squeezed with ampule 3 between the thumb and forefinger to break ampule 3 and release the contents of ampule 3 to the water sample to react with the zinc strip and the water. If an arsenic material in the water sample, arsine will be generated upon release of the contents of ampule 3 to the water sample. Any arsine generated will react with the mercuric salt in paper 5 to produce a yellow to brown color in paper 5 to indicate the presence of an arsenic material in the water. The color intensity imparted to paper 5 is an indicator of the relative concentration of the arsenic material in the water; yellow indicating low concentration and brown indicating high concentration. Arsenic concentrations as low as 1½ p.p.m. can be detected with my apparatus and technique.

It is obvious that other modifications can be made of my invention, and I desire to be limited only by the scope of the appended claims.

I claim:

1. An apparatus for detecting arsenical material in water comprising a clear flexible plastic tube means having a closed end and an open end to contain a predetermined quantity of sample water, a removable cap means having a detection paper impregnated with a mercuric salt adapted to be inserted on the open end of the plastic tube means, a strip of zinc fixedly mounted within the plastic tube means and in contact with the closed end of the plastic tube means, and an easily breakable thin wall glass ampule containing a mixture of potassium bisulfate and cupric sulfate superimposed on the strip of zinc and fixedly mounted within the plastic tube means.

2. The apparatus of claim 1 wherein the cap means has threads formed therein adapted to mate with threads formed in the plastic tube means to removably insert the cap means on the plastic tube means.

3. The apparatus of claim 1 wherein the mercuric salt is mercuric bromide.

4. The apparatus of claim 1 wherein the zinc is in the amount of ½ gram and the mixture of potassium bisulfate and cupric sulfate is in the amount of ½ gram.

5. The apparatus of claim 4 wherein the mixture has the ratio of about 99 parts of potassium bisulfate and about one part of cupric sulfate.

6. The apparatus of claim 1 wherein the zinc is fixedly held within the plastic tube means by the glass ampule and the glass ampule is fixedly held within the plastic tube means by a dimple means formed in the wall of the plastic tube means and projecting inwardly to a point adjacent to the top of the glass ampule.

7. A method of detecting arsenical material in water comprising the steps of placing a strip of zinc metal and a sealed thin wall glass ampule containing a mixture of potassium bisulfate and cupric sulfate in a clear flexible plastic tube means having one end closed and one end open; introducing a water sample to be tested into the plastic tube means; inserting a cap means having a detector paper impregnated with a mercuric salt mounted therein on the open end of the plastic tube means; breaking the glass ampule to release the potassium bisulfate and cupric sulfate to the water sample; reacting the potassium bisulfate, cupric sulfate, zinc, water, and any arsenical material in the water sample to produce arsine; reacting any produced arsine with the mercuric salt in the detector paper to produce a color change in the detector paper in a color spectrum of yellow to brown to indicate the presence of an arsenical material in the water sample.

8. The method of claim 7 wherein the mercuric salt is mercuric bromide.

9. The method of claim 7 wherein the arsenical material in the water sample is detected in an amount as low as about 1½ p.p.m.

References Cited

C. E. Lachele: Anal. Chem. 6, 256 (1934).
Jacobs et al.: Anal. Chem. 14, 442 (1942).
Satterlee et al.: Anal. Chem. 16, 400 (1944).

MORRIS O. WOLK, Primary Examiner

R. M. REESE, Assistant Examiner

U.S. Cl. X.R.

23—253 R, 253 TP